US010969401B2

(12) United States Patent
Karlsson et al.

(10) Patent No.: US 10,969,401 B2
(45) Date of Patent: Apr. 6, 2021

(54) VELOCITY ESTIMATION

(71) Applicant: NIRA DYNAMICS AB, Linkoping (SE)

(72) Inventors: Rickard Karlsson, Linkoping (SE); Fredrik Gustafsson, Linkoping (SE)

(73) Assignee: NIRA DYNAMICS AB, Linköping (SE)

( * ) Notice: Subject to any disclaimer, the term of this patent is extended or adjusted under 35 U.S.C. 154(b) by 181 days.

(21) Appl. No.: 15/751,839

(22) PCT Filed: Aug. 10, 2015

(86) PCT No.: PCT/EP2015/001648
§ 371 (c)(1),
(2) Date: Feb. 9, 2018

(87) PCT Pub. No.: WO2017/025109
PCT Pub. Date: Feb. 16, 2017

(65) Prior Publication Data
US 2018/0231577 A1    Aug. 16, 2018

(51) Int. Cl.
*G01P 3/54*    (2006.01)
*G01P 3/50*    (2006.01)
*G01P 3/48*    (2006.01)

(52) U.S. Cl.
CPC ............... *G01P 3/54* (2013.01); *G01P 3/48* (2013.01); *G01P 3/50* (2013.01)

(58) Field of Classification Search
CPC ............... G01P 3/48; G01P 3/50; G01P 3/54
(Continued)

(56) References Cited

U.S. PATENT DOCUMENTS 5,636,146 A    6/1997   Flentov et al.
6,816,804 B1   11/2004  Lee
(Continued)

FOREIGN PATENT DOCUMENTS

CN    1737577 A      2/2006
CN    102150049 A    8/2011
(Continued)

OTHER PUBLICATIONS

European Patent Office International Search Report of the International Searching Authority, dated Apr. 25, 2016 for International Application No. PCT/EP2015/001648 (5 pgs).
(Continued)

*Primary Examiner* — John H Le
(74) *Attorney, Agent, or Firm* — Womble Bond Dickinson (US) LLP

(57) ABSTRACT

The present disclosure relates to the estimation of a velocity of a first object using accelerometer signals, indicating an acceleration of the first object and/or a second object coupled to a first object. To this end, a characteristic frequency in the accelerometer signal spectrum may be determined, preferably by applying a parametric model or by performing a spectrum analysis, and used as a basis to estimate the velocity of the first object based on the determined characteristic frequency. The characteristic frequency may be determined by identifying the frequency having the maximum spectral amplitude or by identifying the fundamental frequency or a particular harmonic in the spectrum.

11 Claims, 7 Drawing Sheets

(58) Field of Classification Search
USPC .... 702/94, 141, 142, 145, 147, 176; 73/493; 701/46
See application file for complete search history.

(56) References Cited

U.S. PATENT DOCUMENTS

| | | | |
|---|---|---|---|
| 9,075,076 | B2 | 7/2015 | Baechler |
| 2005/0209814 | A1 | 9/2005 | Limin |
| 2011/0082626 | A1* | 4/2011 | Foo ............... G01M 17/007 701/46 |
| 2013/0205896 | A1 | 8/2013 | Baechler |
| 2013/0311123 | A1 | 11/2013 | Nieminen |

FOREIGN PATENT DOCUMENTS

| | | |
|---|---|---|
| CN | 102859940 A | 1/2013 |
| CN | 103323615 A | 9/2013 |
| JP | 2004085511 A | 3/2004 |
| JP | 2006194372 A | 7/2006 |
| JP | 2012160115 A | 8/2012 |

OTHER PUBLICATIONS

European Patent Office—Written Opinion of the International Searching Authority, dated Apr. 25, 2016 for International Application No. PCT/EP2015/001648 (8 pgs).

The Written Opinion for Korean Application No. 10-2018-7006111 dated Apr. 26, 2019, 6 pages.
The First Office Action for Chinese Application No. CN201580082432.4 dated Aug. 5, 2019, 17 pages.
The Second Office Action for Chinese Application No. CN201580082432.4 dated Apr. 28, 2020, 18 pages.
The Written Opinion for Japanese Application No. 2018-0506956 dated Jul. 9, 2019, 7 pages.
The Written Opinion for Japanese Application No. 2018-0506956 dated Jun. 15, 2020, 11 pages.
The Office Action for Korean Application No. 10-2018-7006111 dated Sep. 23, 2019, 5 pages.
The Office Action for Korean Application No. 10-2018-7006111 dated Dec. 24, 2019, 4 pages.
The Written Opinion for Korean Application No. 10-2018-7006111 dated Nov. 18, 2019, 4 pages.
The Notice of Reasons for Refusal for Japanese Application No. 2018-506956 dated Dec. 27, 2019, 6 pages.
The Communication pursuant to Article 94(3) EPC for European Application No. EP 15749988.0 dated Oct. 8, 2019, 2 pages.
The Communication pursuant to Rules 161(1) and 162 EPC for European Application No. EP 15749988.0 dated Mar. 16, 2018, 3 pages.
The Annex for European Application No. EP 15749988.0 dated Oct. 8, 2019, 4 pages.
The Search Report for Chinese Application No. 2015800824324 dated Jul. 22, 2019, 2 pages.
The International Preliminary Report on Patentability for PCT Application No. PCT/EP2015/001648 dated Feb. 13, 2018, 9 pages.

* cited by examiner

VELOCITY ESTIMATION

CROSS-REFERENCE TO RELATED APPLICATION

This patent application is a U.S. National Phase application under 35 U.S.C., 371 of International Application No. PC/EP15101648, filed on 10 Aug. 2015, entitled VELOCITY ESTIMATION.

TECHNICAL FIELD

The present invention disclosure generally relates to the area of estimating a velocity of an object.

BACKGROUND OF THE INVENTION

Motion of vehicles, objects, persons and anything that moves or can be moved (in the following collectively referred to as object, unless otherwise indicated) is characterized by a variety of variables, among which velocity or speed is of particular interest.

Known methods to estimate velocities may be grouped according to their underlying principles. Velocity estimation can be carried out using inertial signals (e.g. from accelerometers), measurements of the Doppler shift of GPS (Global Positioning System) signals and/or measurements by forward-looking radar sensors, similar to a radar gun.

OBJECT OF THE INVENTION

An object of the present invention is to provide solutions for the estimation or determination of a velocity of an object, for example a vehicle, person, electronic equipment and anything else that can move or can be moved.

SUMMARY OF THE INVENTION

In the following, the term "velocity" and "speed" are considered as synonyms, unless otherwise indicated.

In the following, the term "object" refers to any object (e.g. mobile devices, mobile phones, portable computers, clothing, shoes, luggage, . . . ); vehicle (e.g. cars, lorries, trucks, motorbikes, bicycles, scooters, skateboards, ships, skis, aircrafts, . . . ), persons (human beings), animals, and any other thing that can move or be moved.

In the following, the term "first object" indicates an object, the velocity of which is to be determined or, at least, to be estimated, respectively.

In the following, the term "second object" indicates an object, which is coupled to a first object and which is movable in relation to that first object and/or together with that first object.

For example, a second object may be rotatable in relation to a first object. In such cases, for example, a first object may be a vehicle and a second object may be a wheel or wheel rim of the vehicle, wherein the wheel or wheel rim can rotate in relation to the vehicle.

For example, second object may be able to vibrate in relation to a first object. In such cases, for example, a first object may be a vehicle and a second object may be an axle of the vehicle, wherein the axle can vibrate in relation to the vehicle.

For example, a second object may be movable together with a first object. For example, a first object may be a vehicle and a second object may be object (e.g. an electronic device) in and/or of the vehicle, wherein the electronic device can be moved with the vehicle. In particular, an electronic device may be an accelerometer of the vehicle.

Generally, the invention makes use of accelerometer signals, which indicate an acceleration of a first object and/or a second object.

The accelerometer signals may indicate an acceleration of the first object itself or an acceleration of a second object coupled to the first object or combinations thereof.

In any case, the accelerometer signals are used to (at least) estimate a velocity of the first object. Accelerometer signals may indicate an acceleration(s) of zero or different from zero.

Methods, systems and computer program products are disclosed.

Accelerometer signals may, for example, be measured and supplied by an accelerometer. The term "accelerometer" is to be understood to encompass any inertial sensor device or apparatus capable of measuring an acceleration. In particular, translational acceleration and/or rotational acceleration may be measured. Example accelerometers include piezo-electric ones (with a mass attached a piezo sensor, wherein the acceleration of the mass translates into a force acting to deform the piezo, thereby creating an electric voltage) or micro-electro-mechanical systems (MEMS, with a suspended silicon structure acting as a spring and undergoing changes in electric capacitance or resistance upon acceleration).

Preferably, accelerometer signals may indicate a longitudinal or horizontal acceleration of the first object and/or the second object, a lateral acceleration of the first object and/or the second object, or a vertical acceleration of the first object and/or the second object. For instance, a substantial alignment between the accelerometer axes and the first object and/or the second object axes may be obtained if an accelerometer built into the respective one(s) of the first object and/or the second object is used.

Additionally, or alternatively, linear combinations of the above acceleration axes may be indicated by accelerometer signals. For the purpose of the present invention, the first object, the second object and accelerometer do not necessarily need to be fixed with respect to one another. For instance, for velocity estimation of the second object (e.g., a vehicle), accelerometer signals from an accelerometer built into the first object (e.g. smartphone held by a passenger of the vehicle) may be used. Thus, accelerometer signal(s) of the first object may be used for velocity estimation of the second object. This may be particularly used in cases where the first object and the second object are at least partially coupled with respect to velocity.

The term "velocity" is understood to encompass both absolute (scalar) values and vector-type values, which consist of an absolute value and a direction, and combinations thereof. Also, the term "velocity" encompasses both translational speed (e.g. expressed in m.p.h. or km/h) and rotational speed (e.g. expressed in radians per second) as well as combinations thereof. A "velocity" may be zero or different from zero.

In general, a characteristic frequency is determined in the accelerometer signals. In some examples, a frequency spectrum analysis may be performed on the accelerometer signals to obtain an accelerometer signal spectrum. The term "frequency spectrum analysis" particularly refers to any method capable of exploring the induced harmonics, e.g. from a rotational device (axle, wheels, or similar periodic behavior in the surrounding of the measuring device), on the acceleration signal to infer the speed of the object. For example, the vibration properties may be indicative of an energy distribution in the system. One example to conduct such analysis is to apply frequency analysis. For instance, consistent with some examples, the frequency spectrum analysis may comprise non-parametric methods like a Fourier transformation or a Fast Fourier transformation (FFT).

In other examples, alternatively to the frequency spectrum analysis, a model may be applied to the accelerometer signals to obtain an estimation output. For instance, parametric methods like model identification and filtering may be applied. In particular, models may be applied in various signal processing schemes, like Kalman Filters, Sequential Monte-Carlo Filtering, System identification, etc.

In general, a characteristic frequency in the accelerometer signals is determined. For instance, in the case of frequency spectrum analysis, the characteristic frequency may be determined in the accelerometer signal spectrum, wherein the characteristic frequency may be a frequency of maximum spectral amplitude, a fundamental frequency, or a harmonic of the fundamental frequency. Alternatively, in the case of model application, the characteristic frequency may be determined in the estimation output. In particular, the estimation output may comprise a parameter or a parameter vector, which directly or indirectly corresponds to the characteristic frequency.

In general, based on the determined characteristic frequency, the velocity of the first object is estimated. Preferably, estimating the velocity based on the determined characteristic frequency may comprise multiplying the determined characteristic frequency with a proportionality factor.

For instance, in the case of a wheeled vehicle, the proportionality factor may be determined on the basis of a wheel radius. In particular, from the accelerometer signal, a characteristic frequency may be determined, which can be related to the rotational frequency of the wheel due to a proportionality factor of $2*pi*R$, wherein R is the wheel radius, or in the case of an axle the mean value of wheel radii.

In some examples, the accelerometer signals may indicate accelerations of the first object and/or the second object in multiple dimensions. For instance, the accelerometer may be a three-axis accelerometer. The steps of determining a characteristic frequency and estimating the velocity of the first object may thus be carried out for each one of the three axes of the accelerometer.

In some examples, the estimated velocity may be used for sensor fusion. Sensor fusion aims at an increase in reliability or a decrease in uncertainty by combining multiple sensor signals.

For instance, in addition to accelerometer signals, at least one sensor signal indicative of a further object property of the first object and/or the second object may be used and form a further basis for estimating the velocity of the first object. A sensor signal indicative of a further object property may be indicative of any of the following: a wheel speed; a tire pressure; a location; a wheel acceleration; individual tire longitudinal stiffness; ambient and/or tire temperature; suspension pressure; wheel radius change; wheel vibration; wheel acceleration; suspension height information; suspension stiffness; operation of a suspension control system; yaw rate; speed of the first object and/or the second object; a steering wheel angle; a driving or movement condition; particularly a braking condition; operation of a braking system of the first object; brake pressure; operation of an active control device; engine torque of an engine of the first object; wheel slip; tractive force; engine speed of an engine; a gear shift being in progress.

Consistent with some examples the estimated velocity may be used for dead reckoning or inertial navigation or localization. For instance, a position of the first object may be estimated and the estimated position may be updated and/or corrected based on the estimated velocity.

In particular, the position of the first object may be estimated based on a satellite based localization/navigation system (e.g. GPS, GLONASS, Galileo, BeiDou, etc.), a radar system, or a wheel speed sensor. Further, in some examples, updating and/or correcting the estimated position may be further based on map information.

In general, a system to estimate a velocity of a first object is disclosed, comprising a velocity estimation processing part configured to determine a characteristic frequency in accelerometer signals, wherein the accelerometer signals indicate an acceleration of the first object as such and/or a second object coupled to the first object. The above observations in this regard apply here correspondingly.

The acceleration may or may not be different from zero, i.e. the object may be accelerating or not. The velocity estimation processing part is further configured to estimate the velocity of the first object based on the determined characteristic frequency.

For illustration purposes, the first object and the second object coupled to the first object may correspond to a smartphone and a car, respectively. Alternatively, the first object and the second object coupled to the first object may correspond to a car and a wheel, respectively.

In some examples of the system, the velocity estimation processing part may further be configured to perform a frequency spectrum analysis on the accelerometer signals to obtain an accelerometer signal spectrum and to determine the characteristic frequency in the accelerometer signal spectrum.

In other examples of the system, the velocity estimation processing part may be configured to apply a model to the accelerometer signals to obtain an estimation output and to determine the characteristic frequency in the estimation output. The observations made above with regard to the disclosed methods apply here correspondingly.

Consistent with some examples of the system, the accelerometer signals may originate from a first object accelerometer, a navigation system accelerometer, or an accelerometer associated to a portable electronic device. For instance, the portable electronic device may be a phone, a smartphone, a watch, a training computer, a laptop, a tablet computer, or any other device that is equipped with an external accelerometer. In some examples, the system may comprise the accelerometer. In some examples, the accelerometer may be external to the system. Accelerometer signals may be transmitted to the velocity estimation processing part in a variety of ways, including wireless connections (such as WLAN, Bluetooth, RFID, optical communication) or wired connections (such as bus systems, the Controller Area Network CAN).

In some examples of the system, the estimated velocity may be used for sensor fusion. For instance, the velocity estimation processing part may be configured to further receive a sensor signal indicative of a further object property of the first object and/or the second object and to estimate the velocity of the first object based on the at least one sensor signal. A sensor signal indicative of a further objects property may be indicative of any of the following: a wheel speed; a tire pressure; a location; a wheel acceleration; individual tire longitudinal stiffness; ambient and/or tire temperature; suspension pressure; wheel radius change; wheel vibration; wheel acceleration; suspension height information; suspension stiffness; operation of a suspension control system; yaw rate; speed; a steering wheel angle; a driving or movement condition; particularly a braking condition; operation of a braking system; brake pressure; operation of an active control device; engine torque of an engine; wheel slip; tractive force; engine speed of an engine; a gear shift being in progress.

Consistent with some examples, the system may comprise a location estimation part, configured to estimate a position of the first object and to update and/or correct the estimated position based on the estimated velocity. In particular, the location estimation processing part may be configured to update and/or correct the estimated position based on map information.

In some examples, the system may be comprised by a portable electronic device, an electronic control unit of a vehicle, or a motor control unit of a vehicle.

SHORT DESCRIPTION OF THE DRAWINGS

The following detailed description refers to the appended drawings, wherein:

FIG. 1 schematically shows driving vehicles comprising accelerometers and velocity estimation processing parts.

FIG. 2 schematically shows an exemplary accelerometer signal spectrum and a time series of exemplary velocities estimated based on determined characteristic frequencies in accelerometer signal spectra.

FIG. 3 schematically shows an example of a system to estimate a velocity of a vehicle.

FIG. 4 schematically shows a flow diagram of an example of a method of estimating a velocity of a vehicle.

FIG. 5 schematically shows a flow chart of a further example of a method according to the present invention.

DETAILED DESCRIPTION

The following description of the drawings refers to vehicles and smartphones as not limiting examples of first objects.

FIG. 1 schematically shows two driving vehicles 10 equipped with systems for velocity estimation.

Figure 1A:
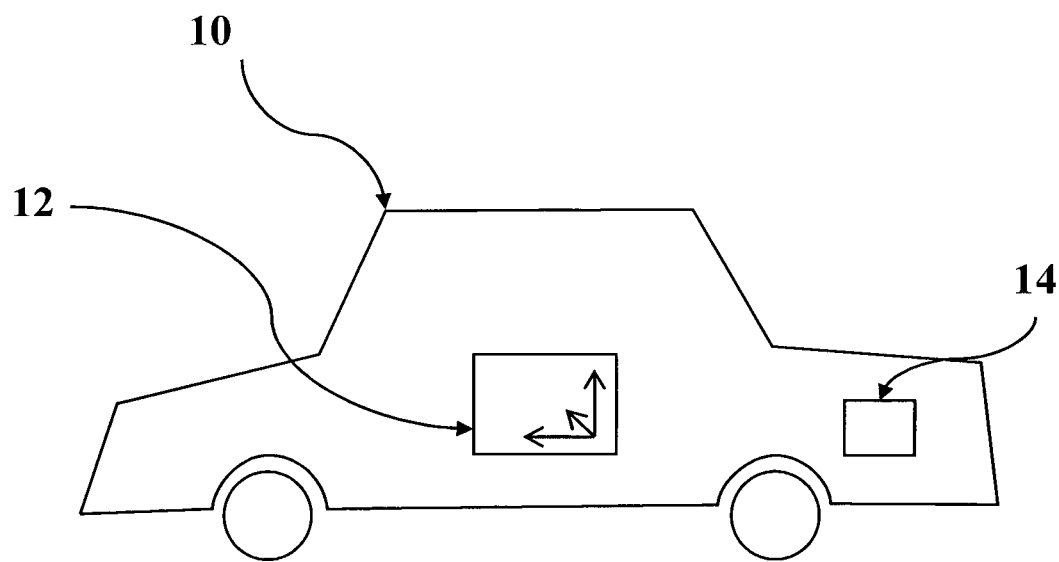

In particular, FIG. 1A shows a driving vehicle 10 comprising a built-in vehicle accelerometer 12 and a velocity estimation processing part 14. The accelerometer 12 is a three-axes accelerometer wherein the three axes of the accelerometer as depicted correspond substantially to the longitudinal, lateral and vertical axes of the vehicle. As a result, the according accelerometer signals from the accelerometer 12 correspond to longitudinal, lateral, and vertical acceleration of the vehicle, respectively. Each of the accelerometer axes may provide information about vehicle velocity. For velocity estimation, accelerometer signals of at least one of the axes may be used by the velocity estimation processing part 14 to determine a characteristic frequency in the accelerometer signals, e.g. by performing a frequency spectrum analysis to obtain at least one accelerometer signal spectrum and by determining the characteristic frequency in the accelerometer signal spectrum. For instance, the accelerometer signals indicative of the longitudinal acceleration axis of the vehicle may be used to perform a frequency spectrum analysis and to determine a characteristic frequency in the accelerometer signal spectrum and to estimate the velocity of the vehicle based on the determined characteristic frequency.

Figure 1B:
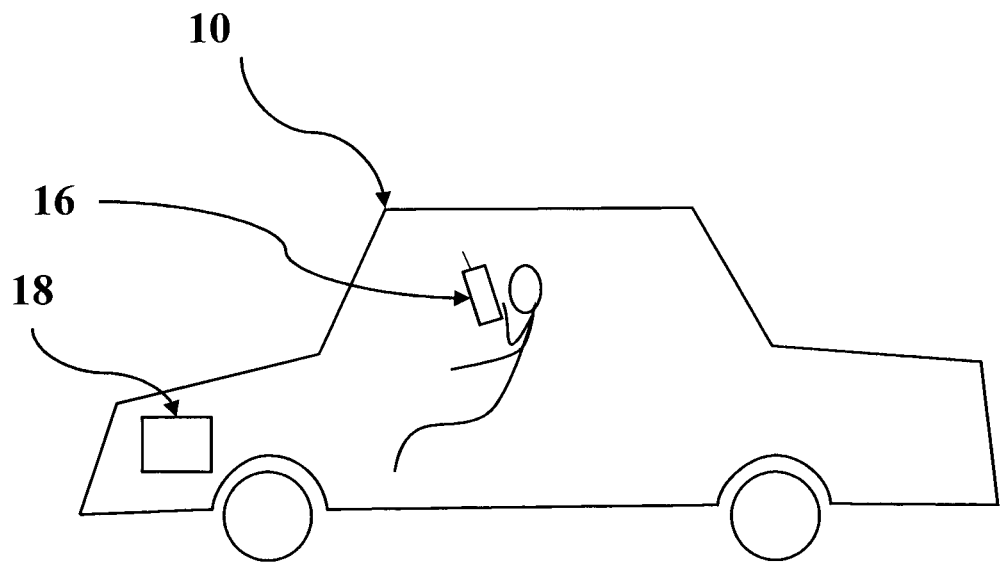

FIG. 1B shows a driving vehicle 10 in the form of a car. The vehicle comprises a smartphone 16, held by a passenger, which comprises both an accelerometer and a velocity estimation processing part. The axes of the accelerometer may in general not coincide with the axes of the vehicle 10. The axes of the accelerometer may vary their orientation relative to the axes of the vehicle, e.g. when the passenger moves his or her hand. Nevertheless, accelerometer signals from the smartphone accelerometer may be used to determine a characteristic frequency in the accelerometer signals, e.g. by performing a frequency spectrum analysis and determining the characteristic frequency in the accelerometer signal spectrum, and to estimate the velocity of the vehicle based on the determined characteristic frequency. The accelerometer signals originating from the accelerometer of smartphone 16 are indicative of an acceleration of vehicle 10. Alternatively to the cars 10 of FIG. 1, any other vehicle may be the object of the velocity estimation, including boats or aircraft. As detailed above and described with reference to FIG. 1B, smartphone 16 may be a stand-alone system for estimating vehicle velocities. However, the estimated velocities and/or accelerometer signals may be transmitted to the vehicle or its electronic control unit (ECU) 18. Alternatively to determining a characteristic frequency by performing a frequency spectrum, the characteristic frequency may be determined by applying a model to the accelerometer signal to obtain an estimation output and by determining the characteristic frequency in the estimation output.

Figure 2A:
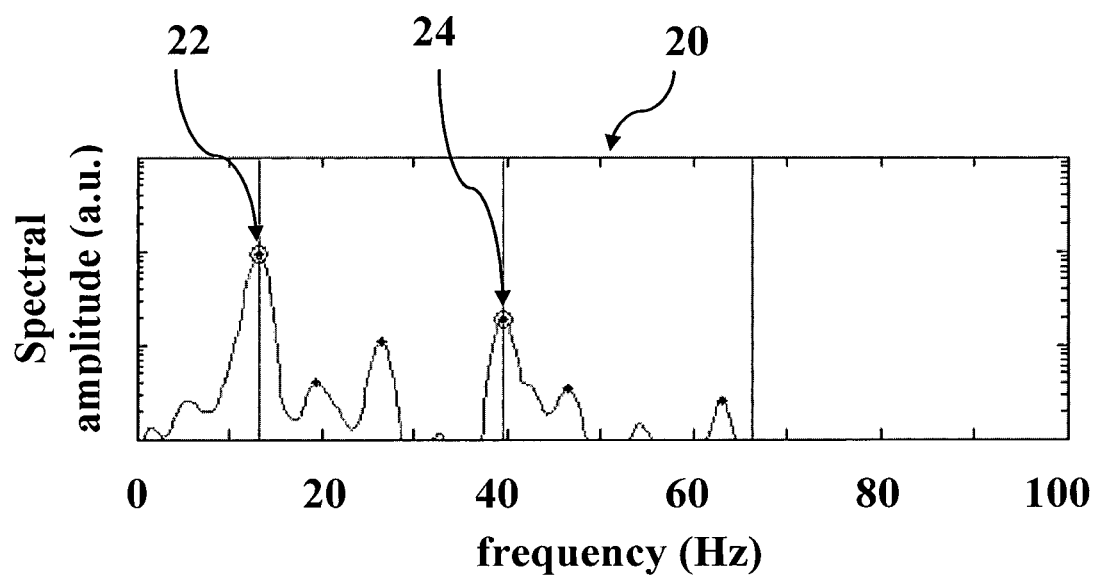

FIG. 2 shows exemplary data. In particular, FIG. 2A shows an exemplary accelerometer signal spectrum 20, which consists of spectral amplitudes as a function of frequencies (in Hertz). The accelerometer signal spectrum 20 has been obtained by performing a frequency spectrum analysis of signals from a longitudinal accelerometer. The accelerometer signal spectrum 20 shows a series of peaks with local maxima of spectral amplitude. In particular, fundamental frequency peak 22 represents the peak corresponding to the fundamental frequency. The corresponding frequency is a fundamental frequency of the accelerometer signal spectrum 20. In the exemplary data depicted in FIG. 2A, the fundamental frequency is approximately 13 Hz. Moreover, the peak of the fundamental frequency is, in the present case, identical to the peak of the global maximum spectral amplitude. The fundamental frequency may in some examples, including the one of FIG. 2, be the characteristic frequency to be determined and used for estimating the velocity of the vehicle. Additionally, or alternatively, other characteristic peaks such as harmonic frequency peak 24 may be used to determine a characteristic frequency. Harmonic frequency peak 24 represents the peak corresponding to a harmonic of the fundamental frequency, namely the second harmonic (wherein the second harmonic frequency equals three times the fundamental frequency) at approximately 39 Hz. In general, the determined characteristic frequency is proportional to the rotational velocity of the wheel. The characteristics of the peaks at fundamental frequency and at harmonic frequencies (overtones) may provide information to increase the reliability of estimated velocities.

Figure 2B:
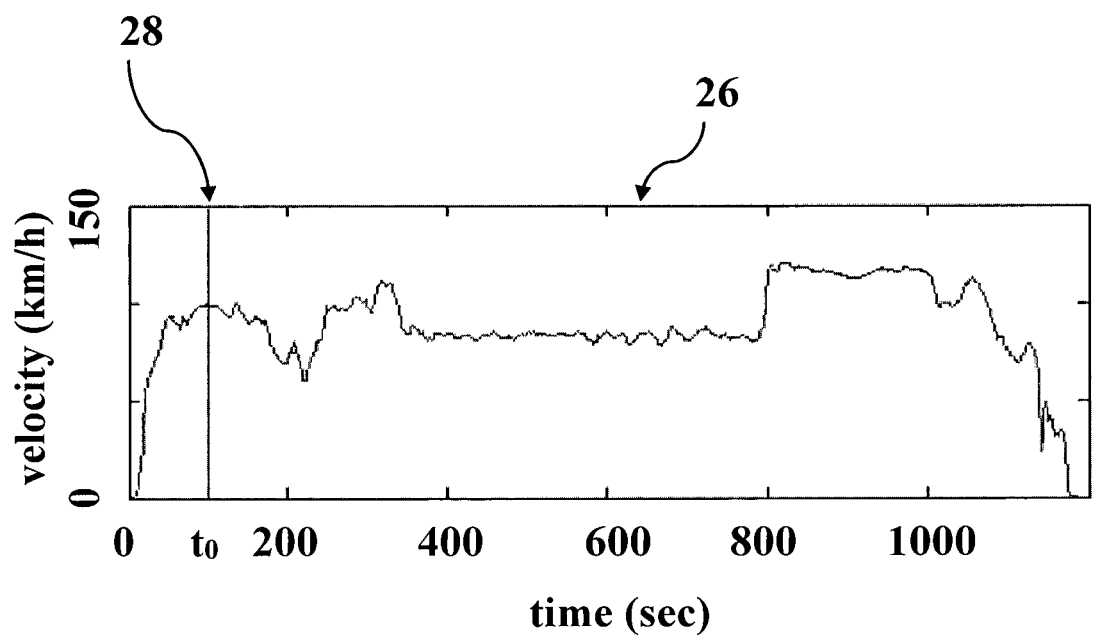

FIG. 2B shows a time series 26 of velocities (in km/h) as a function of time (in seconds). For each data point, i.e. for each velocity value at a given time, the value of the characteristic frequency has been determined. For each data point, based on the determined characteristic frequency, the velocity value has been estimated. For instance, at the time to (depicted in FIG. 2B at approximately 100 sec), the velocity is estimated based on FIG. 2A, namely the determined characteristic fundamental frequency of FIG. 2A. In particular, in the depicted exemplary data, the velocity is estimated by multiplying the determined frequency with a proportionality factor.

In some cases, the velocity time series may show artifacts in the form of spurious discontinuities. These may be due to a false determination of the characteristic frequency (e.g. harmonic peak 24 instead of fundamental harmonic peak 22 in FIG. 2A) and may be eliminated by filtering based on the assumption that velocities typically do not change momentarily or by utilizing the relation between the harmonics.

Figure 3:
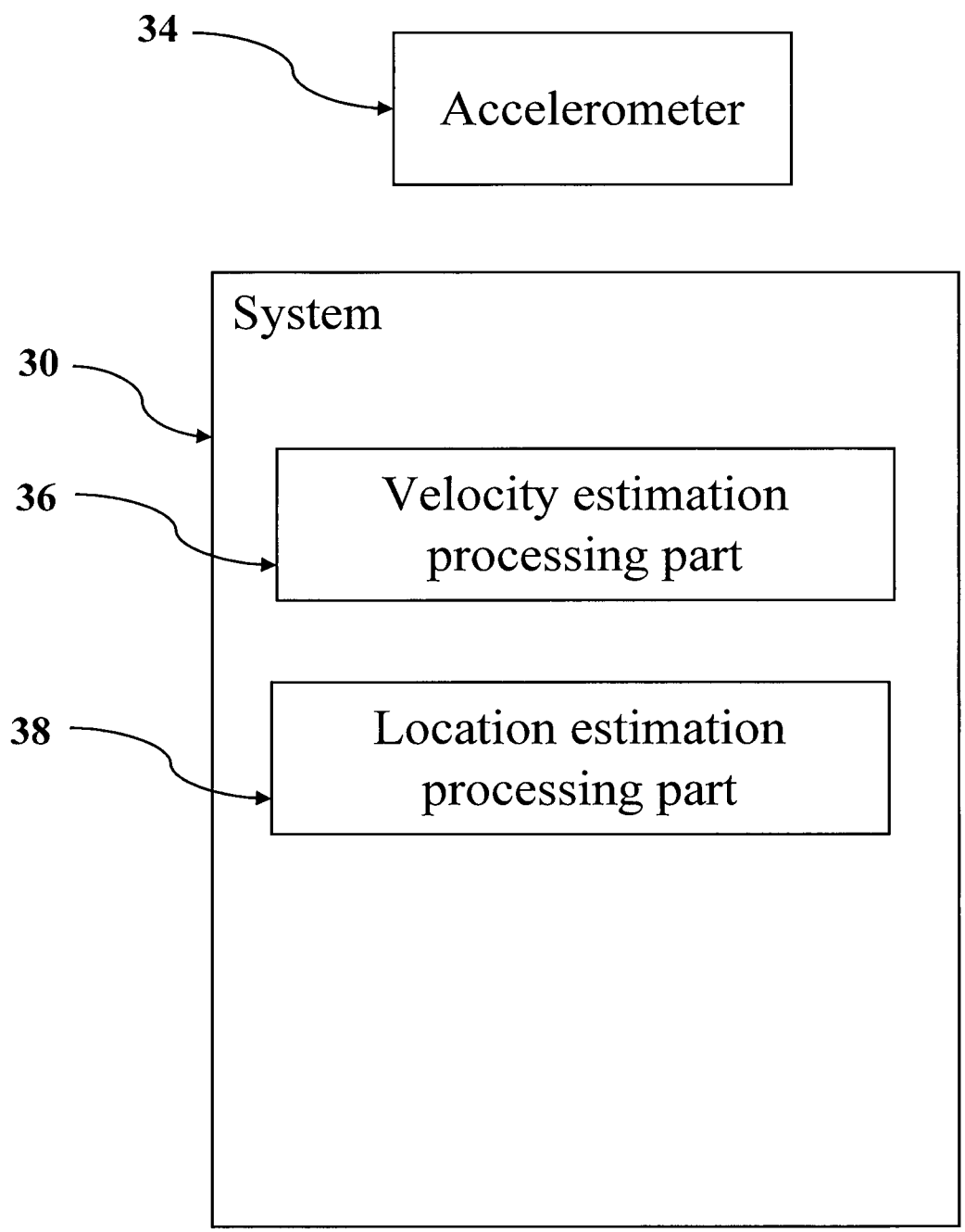

FIG. 3 shows an accelerometer 34 and a system 30 to estimate a velocity of a vehicle comprising a velocity estimation processing part 36. The velocity estimation processing part 36 is configured to determine a characteristic frequency in accelerometer signals, e.g. by performing a frequency spectrum analysis of accelerometer signals from accelerometer 34 to obtain an accelerometer signal spectrum, and to estimate the velocity of the vehicle based on the determined characteristic frequency.

In FIG. 3, the accelerometer is external to the system. However, in further cases, the system as such may comprise the accelerometer. The system of FIG. 3 further comprises an optional location estimation processing part 38, which is configured to estimate a position of the vehicle. The location estimation processing part 38 may be used for navigation and/or sensor fusion, as will be detailed below. Estimated velocities may form a navigation aid, when combined with map information, as known from, e.g. EP 1 332 336 B1.

Map information may include spatially resolved information about roads, i.e. spaces accessible to the vehicle, and non-accessible spaces. With knowledge about the current position of the vehicle, in "real" space or on the map, and with information about the change of position, i.e. the velocity, the system may track the position on the map. This minimizes the error of dead reckoning by excluding non-accessible spaces. For instance, map information may be stored in system 30 or external thereto (e.g. on a memory device or on a remote server).

The velocity estimation processing part 36 and location estimation processing part 38 are depicted as separate parts. They may however, in further cases, be combined into a single processing unit.

Figure 4:
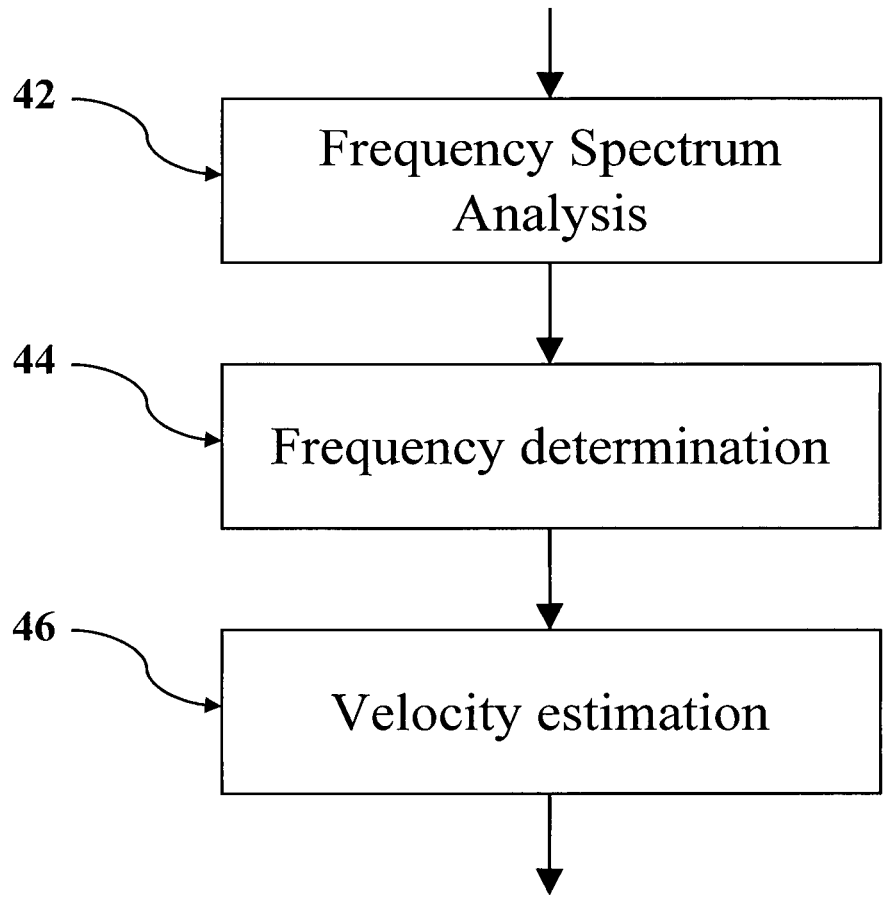

FIG. 4 shows a flow chart of an exemplary method to estimate a velocity of the vehicle, here illustrated to comprise three steps.

A frequency spectrum analysis of accelerometer signals is performed (step 42) to obtain an accelerometer signal spectrum, the accelerometer signals indicating an acceleration of the vehicle. A characteristic frequency is determined (step 44) in the accelerometer signal spectrum. The velocity of the vehicle is estimated (step 46) based on the determined characteristic frequency. Alternatively to the frequency spectrum analysis (step 42), a model may be applied (not shown) to obtain an estimation output, based on which the characteristic frequency may be determined.

Figure 5:
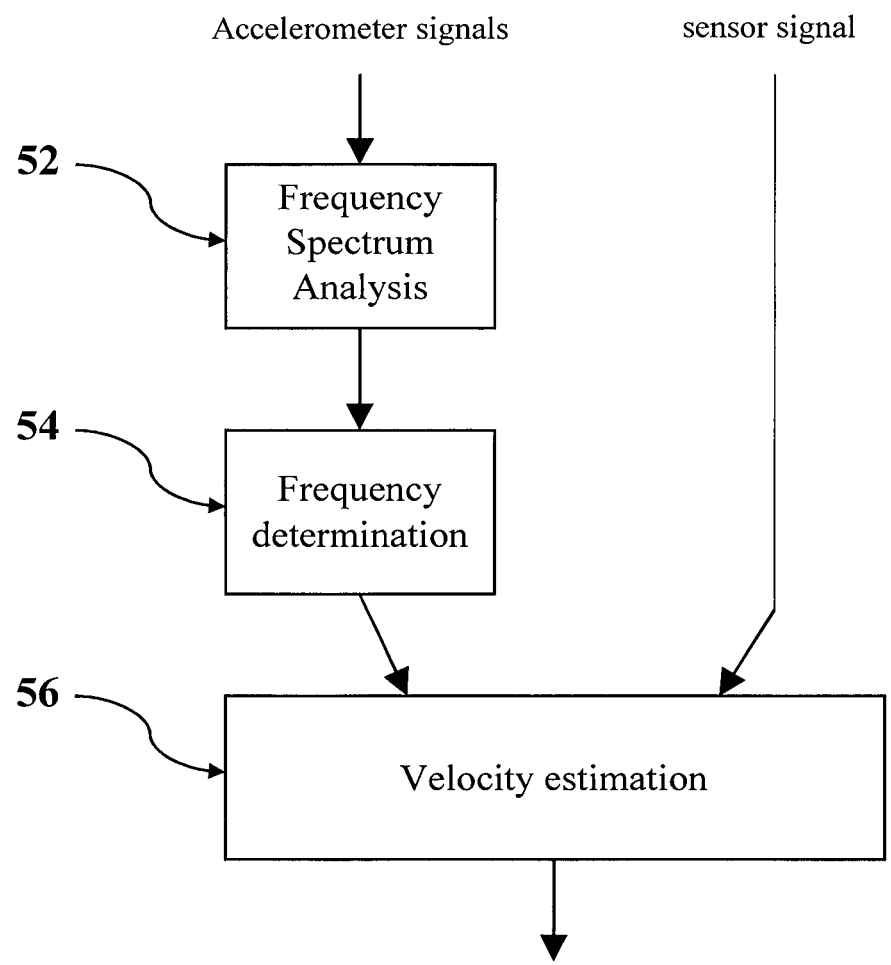

FIG. 5 schematically shows a flow chart of methods to estimate a velocity of a vehicle. Performing a frequency spectrum analysis (step 52) on accelerometer signals may be similar to step 42 of FIG. 4. Determining a characteristic frequency (step 54) in the accelerometer signal spectrum may be similar to step 44 of FIG. 4. In the cases of FIG. 5, velocity estimation (step 56) is based on both the determined characteristic frequency (from accelerometer signals) and a sensor signal, which is indicative of a vehicle property of the vehicle. For instance, this sensor fusion approach may make use of a sensor signal indicating a velocity (measured by a wheel speed sensor, or a radar sensor, or a GPS sensor). In particular, the effective wheel radius, linking wheel rotation frequency and absolute ground speed, may be determined at high accuracy. An example sensor signal, which is indicative of velocity using a wheel speed sensor is described in WO 2005/005993 A1.

Sensor fusion designates the combination of multiple independent measurements of a common underlying quantity or value. It makes use of the fact, that each measurement will have its own error. However, between the multiple independent measurements, these errors are not related. For the independence of measurements, multiple sensors may be used. As described here, the common underlying quantity is vehicle velocity. Independent measurements by disparate sensors may be carried out on the basis of accelerometer signals and on the basis of wheel speed sensors, for instance. The objective of sensor fusion is to increase reliability on data and decrease uncertainty. With respect to velocity measurements, this approach is particularly advisable.

Figure 6:
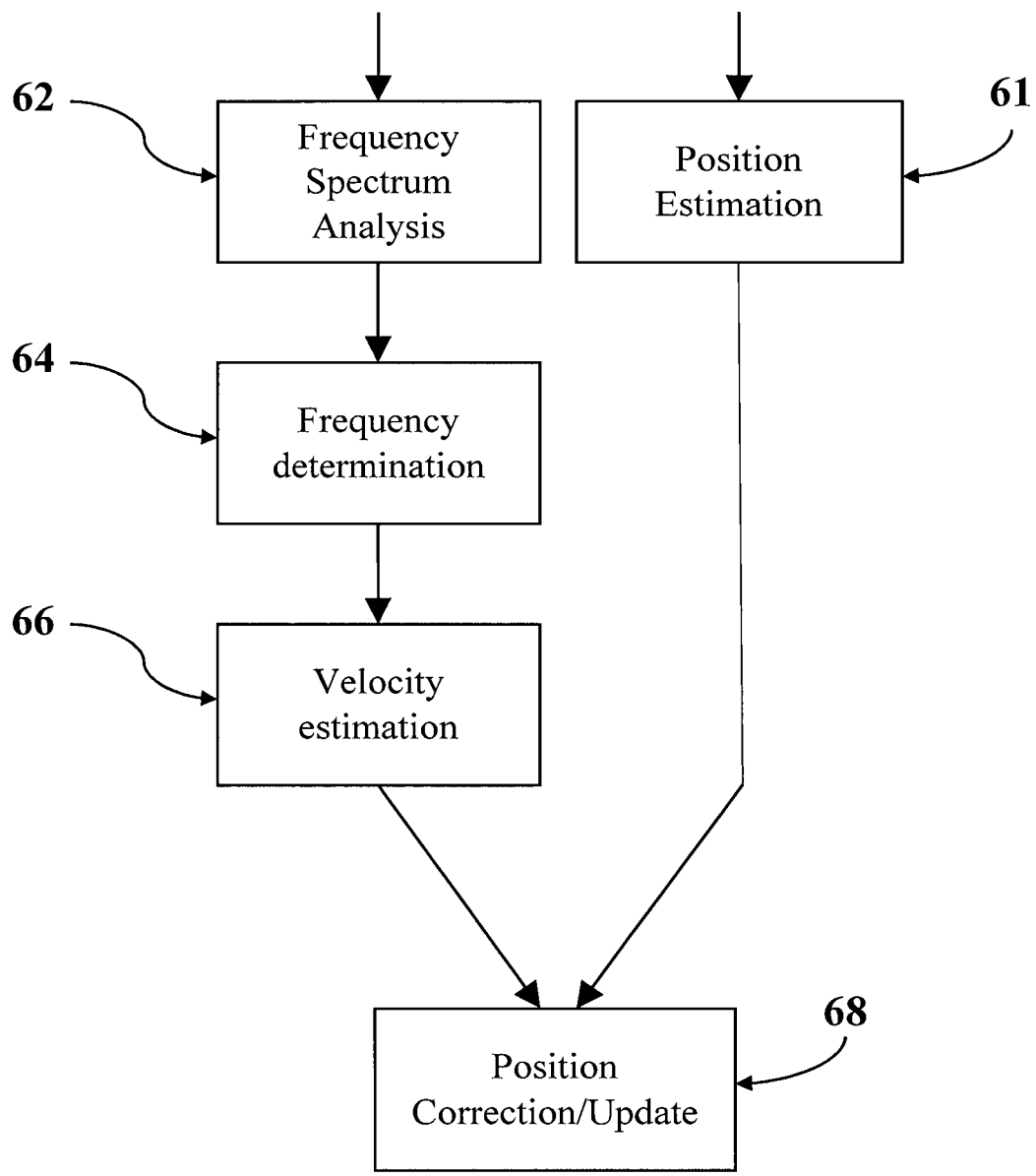
FIG. 6 shows a further flow chart of a further example of a method according to the present invention.

FIG. 6 shows a flow chart of further methods to estimate a velocity of a vehicle. Steps 62, 64, and 66 may be similar to steps 42, 44, and 46 of FIG. 4, respectively. In addition to these steps, the method depicted in FIG. 6 comprises estimating a position of the vehicle (step 61) and correcting and/or updating the estimated position (step 68) of the vehicle based on the estimated velocity. Step 61 of estimating the position is performed by means of the Global Positioning system, GPS. Step 68 of correcting and/or updating the position may be used for a dead reckoning or inertial navigation. For instance, GPS signals may be available intermittently to estimate the current location or position of the vehicle. During non-availability of up-to-date GPS signals (for any of a variety of reasons, including bad reception), the most recent GPS signal may be updated iteratively. Once a more recent GPS signal becomes available, this newly estimated position of the vehicle forms the basis for dead reckoning navigation. This combination of GPS and dead reckoning limits the drawback of errors cumulating in pure dead reckoning (the error of each velocity estimation adds to the positioning error) and reduces the dependence on quasi-continuous GPS signals. In addition, more sparsely sampling GPS signals may add to battery life of mobile GPS receivers. In addition to estimating the position, this method may take into account map information, as detailed above, with reference to FIG. 3.

Figure 7:
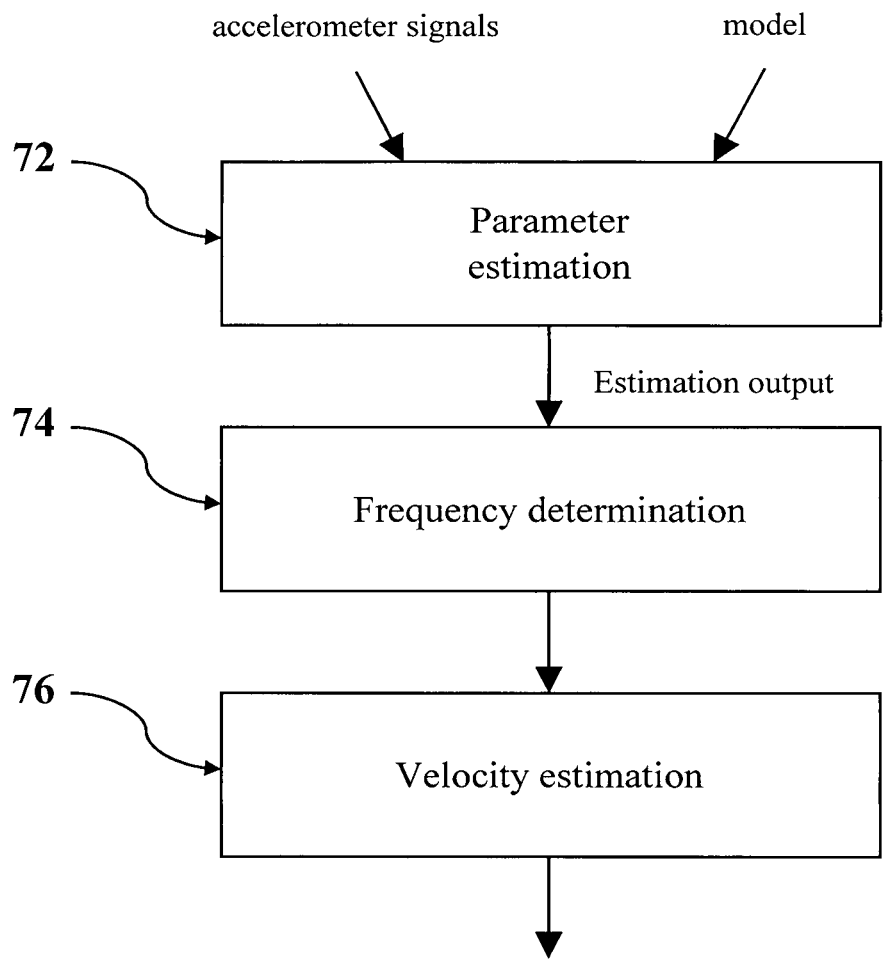
FIG. 7 shows a further flow chart of a further example of a method according to the present invention.

FIG. 7 shows a flow chart of an exemplary method to estimate a velocity of the vehicle, here illustrated to comprise three steps. Parameter estimation is carried by applying a model to accelerometer signals (step 72), in order to obtain an estimation output, e.g. comprising a parameter such as a frequency or a parameter vector. The accelerometer signals indicate an acceleration of the vehicle. A characteristic frequency is determined (step 74) in the estimation output. The velocity of the vehicle is estimated (step 76) based on the determined characteristic frequency.

The parameter estimation (step 72) considers a state-space model. The model may be defined in discrete time $t = k*T$, wherein T is a unit time, by a transition relation and a measurement relation.

For instance, the following transition relation may define how the estimation output changes from one point in time (k) to the next point in time (k+1):

$$x(k+1)=F(x(k),w(k)),$$

where x(k) is the (yet to be estimated) estimation output, F(x) is a nonlinear model function, and w(k) describes the uncertainty or noise in the model.

For instance, the following measurement relation defines how the estimation output influences the measurement outcome:

$$y(k)=H(x(k))+e(k),$$

where H(x) is a nonlinear measurement function and e(k) represents the measurement uncertainty or measurement noise. The model noise w(k) and/or the measurement noise e(k) may for instance be Gaussian distributed with zero mean and finite covariance.

According to FIG. 7, the model applied in step 72 is given by imposing a sum of sinus functions with unknown amplitude, frequency and phase for the accelerometer signals (or each component thereof). The acceleration signals a(t) correspond to the measurement outcome y(k). Hence the acceleration signals a(t) can for example be written as $$a(t)=\Sigma_i A_i \sin(2\pi f_i t+\varphi_i)+e(t),$$

where the parameters are given by the amplitude ($A_i$), frequency ($f_i$), and phase. For periodic behavior, one can restrict the frequencies fi to multiples of a (yet unknown and yet to be determined) characteristic frequency, since periodic behavior can be described by Fourier series.

By imposing these exemplary model constraints, parametric estimation methods, including but not limited to nonlinear least squares, Kalman filter, particle filter (sequential Monte Carlo) allow to find the characteristic frequency directly or indirectly from the estimated parameters, i.e. the estimation outcome.

The step of parameter estimation yields a point estimate of x(k) from measurements y(k) (or a(t)). For instance, the dynamic function F(x) can be, for example $$F(x(k))=x(k)+w(k)$$

wherein the parameters can be considered constant but uncertain. Alternatively, other models can be utilized. In the present case, the model, including the measurement relation, may relate the characteristic frequency to the observed measurements.

According to FIG. 7, the measurement relation uses the characteristic frequency as one parameter (as described above), which will be estimated and will be comprised by the estimation output. In other examples, the characteristic frequency will not necessarily be comprised by the estimation output, but may be determined indirectly based on the estimation output.

Based on the determined characteristic frequency, the velocity of the vehicle may be estimated, which may be carried out identically or similarly to the examples above, including the examples comprising a step of performing a frequency spectrum analysis.

What is claimed is:

1. A method of estimating a velocity of a vehicle, the vehicle being a wheeled vehicle, comprising:

determining a characteristic frequency in accelerometer signals, which indicate an acceleration of a second object coupled to the vehicle, wherein the characteristic frequency is related to a relational frequency of a wheel of the vehicle, and estimating the velocity of the vehicle based on the determined characteristic frequency, the vehicle comprising a car or truck, the second object is an electronic device in the vehicle, coupled to the vehicle and movable together with said vehicle, and the determining comprises:

performing a frequency spectrum analysis of accelerometer signals to obtain an accelerometer signal spectrum, and determining the characteristic frequency in the accelerometer signal spectrum, or applying a model to the accelerometer signals to obtain an estimation output, and determining the characteristic frequency in the estimation output.

2. The method according to claim 1, wherein determining the characteristic frequency is at least one of the following:

determining a frequency of maximum spectral amplitude;

determining a fundamental frequency;

determining a harmonic of the fundamental frequency;

accelerometer signals indicating a longitudinal or horizontal acceleration;

accelerometer signals indicating a lateral acceleration;

accelerometer signals indicating a vertical acceleration.

3. The method of claim 1, wherein estimating the velocity of the vehicle comprises multiplying the determined characteristic frequency with a proportionality factor.

4. The method of claim 1, further comprising:

estimating the velocity of the vehicle is further based on at least one sensor object property signal indicative of a further object property of the vehicle and/or the second object.

5. The method of claim 1, further comprising:

estimating a position of the vehicle and/or the second object, and updating and/or correcting the estimated position of the vehicle and/or the second object based on the estimated velocity.

6. A computer program product including program code configured to, when executed by a computing device, to carry out a method of estimating a velocity of a vehicle, the vehicle being a wheeled vehicle, comprising:

determining a characteristic frequency in accelerometer signals, which indicate an acceleration of a second object coupled to the vehicle, wherein the characteristic frequency is related to a rotational frequency of a wheel of the vehicle, and estimating the velocity of the vehicle based on the determined characteristic frequency, the vehicle comprising a car or a truck, the second object is an electronic device in the vehicle, coupled to the vehicle and movable together with said vehicle, and the determining comprises:

performing a frequency spectrum analysis of accelerometer signals to obtain an accelerometer signal spectrum, and determining the characteristic frequency in the accelerometer signal spectrum, or applying a model to the accelerometer signals to obtain an estimation output, and determining the characteristic frequency in the estimation output.

7. A system to estimate a velocity of a vehicle, the vehicle being a wheeled vehicle, comprising a velocity estimation processing part configured to:
   determine a characteristic frequency in accelerometer signals, which indicate an acceleration of a second object coupled to the vehicle, wherein the characteristic frequency is related to a rotational frequency of a wheel of the vehicle, and
   estimate the velocity of the vehicle based on the determined characteristic frequency,
   the vehicle comprising a car or a truck,
   the second object is an electronic device in the vehicle, coupled to the vehicle and movable together with said vehicle, and
   the velocity estimating processing part configured to determine the characteristic frequency in acceleration signals further comprises the processing part configured to:
   perform a frequency spectrum analysis of accelerometer signals to obtain an accelerometer signal spectrum, and determining the characteristic frequency in the accelerometer signal spectrum,
   applying a model to the accelerometer signals to obtain an estimation output, and determining the characteristic frequency in the estimation output.

8. The system according to claim 7, wherein the accelerometer signals are from at least one of:
   a vehicle accelerometer,
   a navigation system accelerometer,
   an accelerometer associated to a portable electronic device, or
   a device equipped with an external accelerometer.

9. The system according to claim 7, wherein the velocity estimation processing part is further configured to:
   estimate the velocity of the vehicle further based on at least one object property sensor signal indicative of a further object property of the vehicle and/or the second object.

10. The system according to claim 7, further comprising a location estimation processing part configured to:
    estimate a position of the vehicle and/or the second object, and
    update and/or correct the estimated position of the vehicle based on the estimated velocity.

11. The system according to claim 7, wherein the system is comprised of one of the following:
    a portable electronic device comprising a phone, a watch, a training computer, a laptop, or a tablet; or
    a Motor/Electronic Control Unit (M/ECU) of the vehicle.

* * * * *